United States Patent
Fong et al.

(10) Patent No.: US 11,077,760 B2
(45) Date of Patent: Aug. 3, 2021

(54) PRECHARGING FOR DIRECT CURRENT FAST CHARGING

(71) Applicant: Ford Global Technologies, LLC, Dearborn, MI (US)

(72) Inventors: Wai Hwa Fong, Canton, MI (US); Yuan Zhang, Southgate, MI (US); Navid Rahbari Asr, Inkster, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 257 days.

(21) Appl. No.: 16/285,464

(22) Filed: Feb. 26, 2019

(65) Prior Publication Data

US 2020/0269710 A1     Aug. 27, 2020

(51) Int. Cl.
*B60L 53/10*     (2019.01)
*B60L 53/16*     (2019.01)
*H02J 7/00*     (2006.01)
*B60L 53/30*     (2019.01)
*B60L 53/62*     (2019.01)

(52) U.S. Cl.
CPC .............. *B60L 53/11* (2019.02); *B60L 53/16* (2019.02); *B60L 53/305* (2019.02); *B60L 53/62* (2019.02); *H02J 7/007* (2013.01); *H02J 7/0045* (2013.01)

(58) Field of Classification Search
CPC .. H02J 7/02; H02J 7/0045; H02J 7/007; H02J 7/0071; H02J 2310/48; B60L 11/185; B60L 11/1805; B60L 53/11; B60L 53/16; B60L 53/305; B60L 53/62
USPC .................................................. 716/109, 163
See application file for complete search history.

(56) References Cited

U.S. PATENT DOCUMENTS

| | | |
|---|---|---|
| 9,114,716 B2 | 8/2015 | Loftus et al. |
| 2013/0234675 A1* | 9/2013 | King .......................... H02J 7/02 320/163 |
| 2014/0084818 A1 | 3/2014 | Sugiyama et al. |
| 2016/0190841 A1 | 6/2016 | Galamb |
| 2017/0334303 A1 | 11/2017 | Kristof |

* cited by examiner

*Primary Examiner* — Paul Dinh
(74) *Attorney, Agent, or Firm* — David B Kelley; Brooks Kushman P.C.

(57) ABSTRACT

A vehicle includes a traction battery; a bus; a main contactor between the traction battery and bus; a precharge contactor between the traction battery and bus in parallel with the main contactor; and a controller configured to, responsive to a first precharge mode signal, command a charging station to increase a voltage on the bus and subsequently close the precharge contactor before closing the main contactor, and responsive to a second precharge mode signal, close the precharge contactor without first commanding the charging station to increase the voltage on the bus before closing the main contactor.

16 Claims, 4 Drawing Sheets

PRECHARGING FOR DIRECT CURRENT FAST CHARGING

TECHNICAL FIELD

The present disclosure relates to vehicle direct current (DC) charging.

BACKGROUND

Electric-powered vehicles such as battery electric vehicles (BEV) or hybrid-electric vehicles may be plugged in through a DC fast charging port to recharge depleted energy. However, different countries and jurisdictions may have different charging standards. For instance, in North America and Europe, the off-board charger may precharge the DC bus based on a vehicle command, whereas in China, the vehicle may precharge the DC bus.

SUMMARY

A vehicle includes a traction battery; a bus; a first main contactor between the traction battery and bus; a precharge contactor between the traction battery and bus in parallel with the first main contactor; and a controller configured to, responsive to a first precharge mode signal, command a charging station to increase a voltage on the bus and subsequently close the precharge contactor before closing the first main contactor, and responsive to a second precharge mode signal, close the precharge contactor without first commanding the charging station to increase the voltage on the bus before closing the first main contactor.

A method for a vehicle includes responsive to a first precharge mode signal, commanding a charging station to increase a voltage on a bus and subsequently closing a precharge contactor between a battery and the bus in parallel with a first main contactor, and responsive to a second precharge mode signal, closing the precharge contactor without first commanding the charging station to increase the voltage on the bus.

A vehicle includes a traction battery; a bus; a precharge contactor between the traction battery and bus; and one or more controllers configured to, responsive to a first precharge mode signal, command a charging station, via an off-board charger controller (OBCC), to increase a voltage on the bus and subsequently close the precharge contactor, and responsive to a second precharge mode signal, close the precharge contactor without first commanding the charging station to increase the voltage on the bus.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A charging station may provide indication of current transferred between itself and a vehicle while the vehicle is plugged in and charging. During a disconnect procedure, the vehicle may open a contactor configured to receive current from the charging station to stop the flow of electricity. In order to open the contactors, the vehicle may be required to have—through procurement or inference—its own charge current values during the disconnect procedure because this information is not always available during the disconnect procedure. Meaning, the vehicle must use its own—measurement or estimate—charge current value to enable opening of the contactor because the current value from the charge station is not available when the contactor disconnect procedure is occurring. Instead of adding an additional current sensor to perform this measurement during disconnection, the vehicle may estimate the current flowing through the contactor after a disconnection request is made.

Indeed, a vehicle controller may perform an estimate of the charge current by aggregating the auxiliary loads of the vehicle and the current flowing from the traction battery without measuring charge current directly or receiving it from the charging station. The aggregation of auxiliary loads may include error due to measurement uncertainty. Error compensation may be implemented through a feedback loop designed to compare the current estimate from the aggregation to the known current value from the charging station while the vehicle is charged. A learning algorithm may be used to improve the accuracy of the estimation during charging such that when a disconnection procedure occurs, a more accurate estimation is used, thus preventing welding or scarring of the contactor or delayed opening of the contactor.

Figure 1:
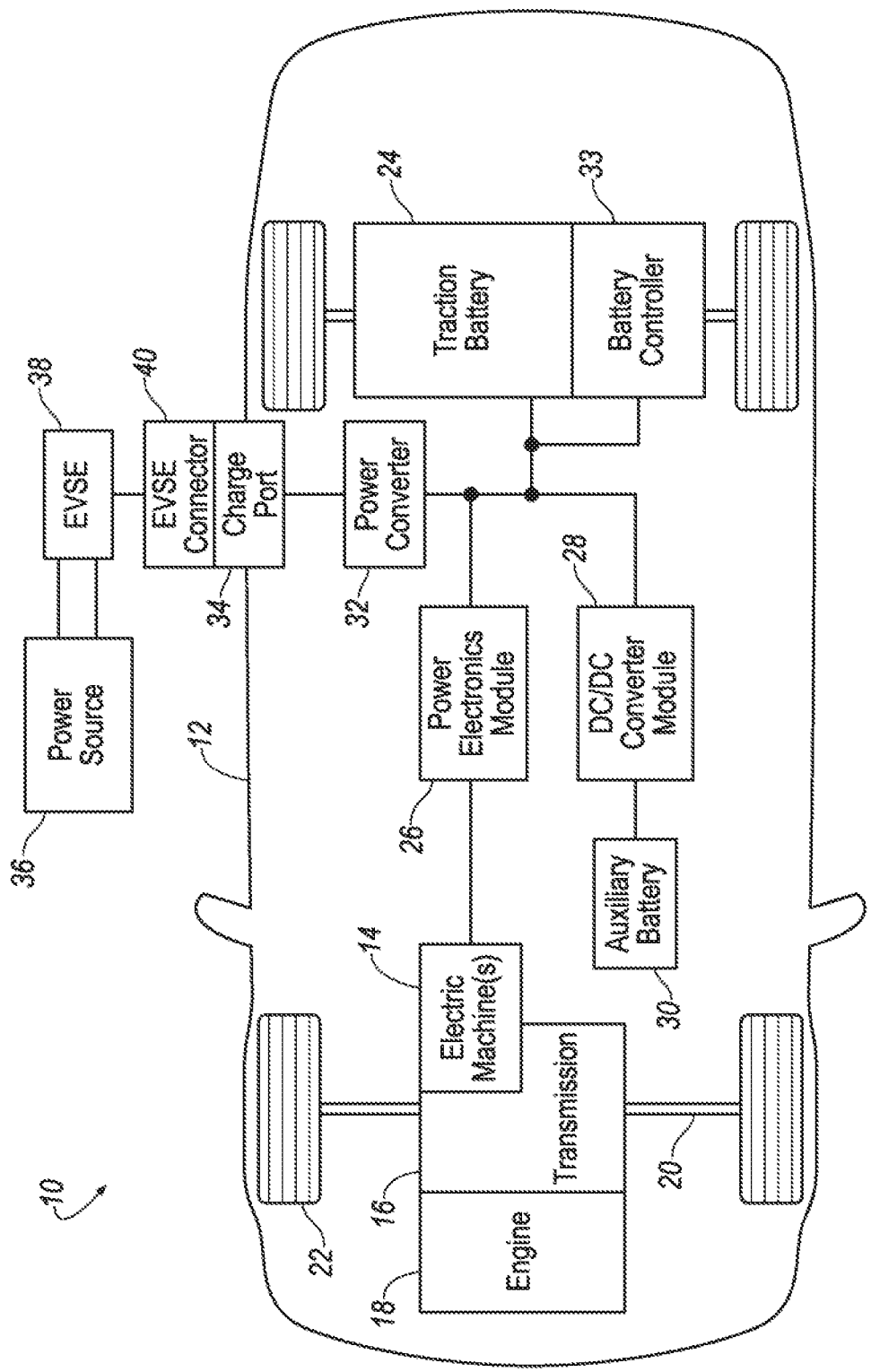
FIG. 1 illustrates a system overview of a plugin vehicle.

FIG. 1 depicts a block diagram 10 illustrating a vehicle 12 comprising one or more electric machines 14 mechanically connected to a hybrid transmission 16. The electric machines 14 may be capable of operating as a motor or a generator. In addition, the hybrid transmission 16 may be mechanically connected to an engine 18. The hybrid transmission 16 may also be mechanically connected to a drive shaft 20 that is mechanically connected to the wheels 22. The electric machines 14 can provide propulsion and deceleration capability when the engine 18 is turned on or off. The electric machines 14 may also act as generators and may provide fuel economy benefits by recovering energy that would normally be lost as heat in the friction braking system. The electric machines 14 may also provide reduced pollutant emissions since the hybrid-electric vehicle 12 may be operated in electric mode or hybrid mode under certain conditions to reduce overall fuel consumption of the vehicle 12.

A traction battery (or battery pack) 24 stores and provides energy that may be used by the electric machines 14. The traction battery 24 may provide a high voltage DC output from one or more battery cell arrays, sometimes referred as battery cell stacks, within the traction battery 24. The battery cell arrays may include one or more battery cells. The traction battery 24 may be electrically connected to one or more power electronics controllers 26 through one or more contactors (not shown). The one or more contactors isolate the traction battery 24 from other components when opened and connect the traction battery 24 to other components when closed.

The power electronics controller 26 may also be electrically connected to the electric machines 14 and may be configured to bi-directionally transfer electrical energy between the traction battery 24 and the electric machines 14. For example, the traction battery 24 may provide a DC voltage while the electric machines 14 may require a three-phase AC voltage to function. The power electronics controller 26 may convert the DC voltage to a three-phase AC voltage as required by the electric machines 14. In a regenerative mode, the power electronics controller 26 may convert the three-phase AC voltage from the electric machines 14 acting as generators to the DC voltage required by the traction battery 24. Portions of the description herein are equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A DC/DC converter 28 may convert high voltage DC output of the traction battery 24 to a low voltage DC supply that is compatible with other vehicle loads. Other high-voltage loads, such as compressors and electric heaters, may be connected directly to the high-voltage without the use of the DC/DC converter 28. The low-voltage systems may be electrically connected to an auxiliary battery 30 (e.g., 12V battery).

A battery control module 33 may be in communication with the traction battery 24. The battery controller 33 may be configured to monitor and manage operation of the traction battery 24, such as via an electronic monitoring system (not shown) that manages temperature and charge state of each of the battery cells.

The vehicle 12 may be, for example, an electrified vehicle that includes components for a plug-in hybrid electric vehicle (PHEV), a full hybrid electric vehicle (FHEV), a mild hybrid electric vehicle (MHEV), or a battery electric vehicle (BEV). The traction battery 24 may be recharged by an external power source 36. The external power source 36 may be a connection to an electrical outlet. The external power source 36 may be electrically connected to electric vehicle supply equipment (EVSE) or charge station 38. The charge station 38 may provide circuitry and controls to regulate and manage the transfer of electrical energy between the power source 36 and the vehicle 12. The external power source 36 may provide DC or AC electric power to the charge station 38.

The charge station 38 may have a charge connector 40 for plugging into a charge port 34 of the vehicle 12. The charge port 34 may be any type of port configured to transfer power from the charge station 38 to the vehicle 12. The charge port 34 may be electrically connected to a charger or on-board power converter 32. The power converter 32 may condition the power supplied from the charge station 38 to provide the proper voltage and current levels to the traction battery 24. The power converter 32 may interface with the charge station 38 to coordinate the delivery of power to the vehicle 12. The charge station connector 40 may have pins that mate with corresponding recesses of the charge port 34.

Figure 2:
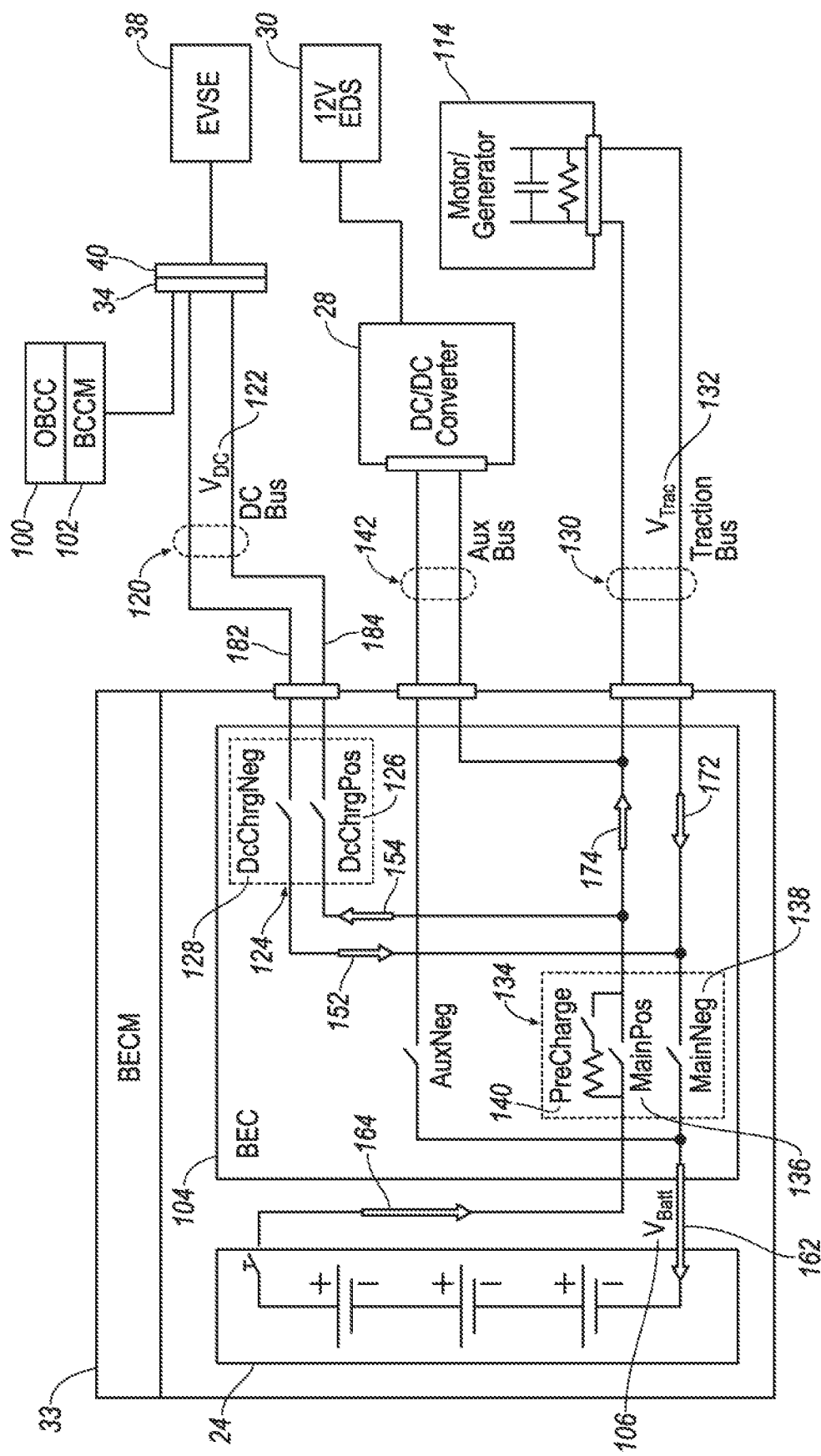
FIG. 2 illustrates an over w of a high voltage system of a plugin vehicle.

Referring to FIG. 2, an electrical bus system of the vehicle 12 is illustrated. As current is drawn from the charge station 38 through charging port 34 and charge connector 40, the battery control module 33 controls energy flowing into and out of the battery 24 through a charging bus or DC bus 120. The charge port 34 may be connected to an off board charger controller OBCC 100 (also known as a a digital communications gateway module (DCGM)) in communication with the charge station 38. The OBCC 100 may be configured to receive a signal indicative of a request to transfer electric energy between the charge station 38 and the battery pack 24 via an AC or a DC charging session. In the present disclosure, a DC charging session is used. The OBCC 100 may also be in communication with a battery charger control module (BCCM) or on-board charger 102 configured to process communication signals between the vehicle 12 and the charge station 38. The OBCC 100 communicates with the charging station 38 through a medium for digital communications which can be Wi-Fi, Power Line Communications (PLC), Controller Area Network (CAN), etc.

The battery pack 24 may include one or more battery cells and be connected to a bussed electric center (BEC) 104, and a battery energy control module (BECM) 33. The battery 24 may include a positive lead 164 and a negative lead 162 connected to a positive terminal and a negative terminal of the battery pack 24 respectively. A voltage difference between the battery positive lead 164 and the battery negative lead defines a battery pack voltage $V_{Batt}$ 106. The BEC 104 may include a set of traction bus contactors 134 connected between the battery pack 24 and a motor/generator 114. The traction bus contactors 134 may include a traction bus positive contactor 136 (also known as a main positive contactor 136, or traction positive contactor 136) connected between the battery positive lead 164 and a traction bus positive lead 174, and a traction bus negative contactor 138 (also known as a main negative contactor 138, or traction negative contactor 138) connected between the battery negative lead 162 and a traction bus negative lead 172. The traction bus positive lead 174 and the traction bus negative lead 172. (along with the cablelwire connected therefrom) define a traction bus 130. A voltage difference between the traction bus positive lead 174 and the traction bus negative lead 172 defines a traction bus voltage $V_{Trac}$ 132. A precharge circuit may be connected in parallel to one of the contactors 134. As illustrative in the present example, the precharge circuit is connected in parallel to the traction positive contactor 136. The precharge circuit may include a resistor connected in serial to a precharge contactor 140.

The BEC 104 may further include a set of DC charge contactors or DC contactors 124 having a DC positive lead 154 and DC negative lead 152 for connecting to the battery positive lead 164 and the battery negative leads 162 respectively. The DC contactors 124 may include a DC positive contactor 126 connected between the DC positive lead 154 and a DC positive cable 184, and a DC negative contactor 128 connected between the DC negative lead 152 and a DC negative cable 182. The DC positive cable 184 and the DC negative cable 182 define a DC charge bus or DC bus 120. A voltage difference between the DC positive cable 184 and the DC negative cable 182 defines a DC bus voltage $V_{DC}$ 122. The BEC 104 may also include an auxiliary bus 142 connected to the low voltage loads 30 via the high voltage to low voltage converter 28. Each of these loads may be estimated or measured.

Figure 3A:
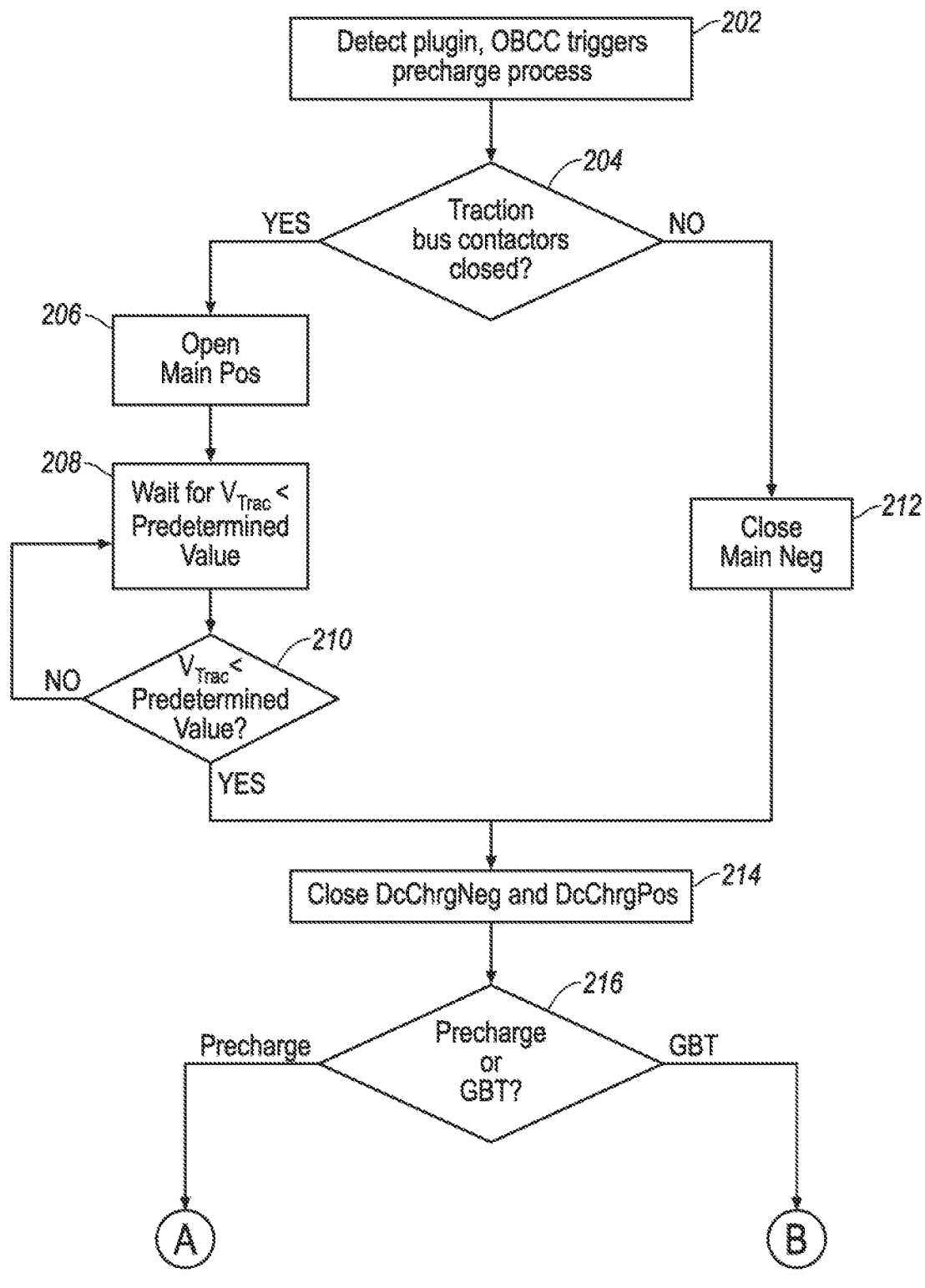
FIGS. 3A and 3B illustrate a flow diagram for operation of a precharge process.
Figure 3B:
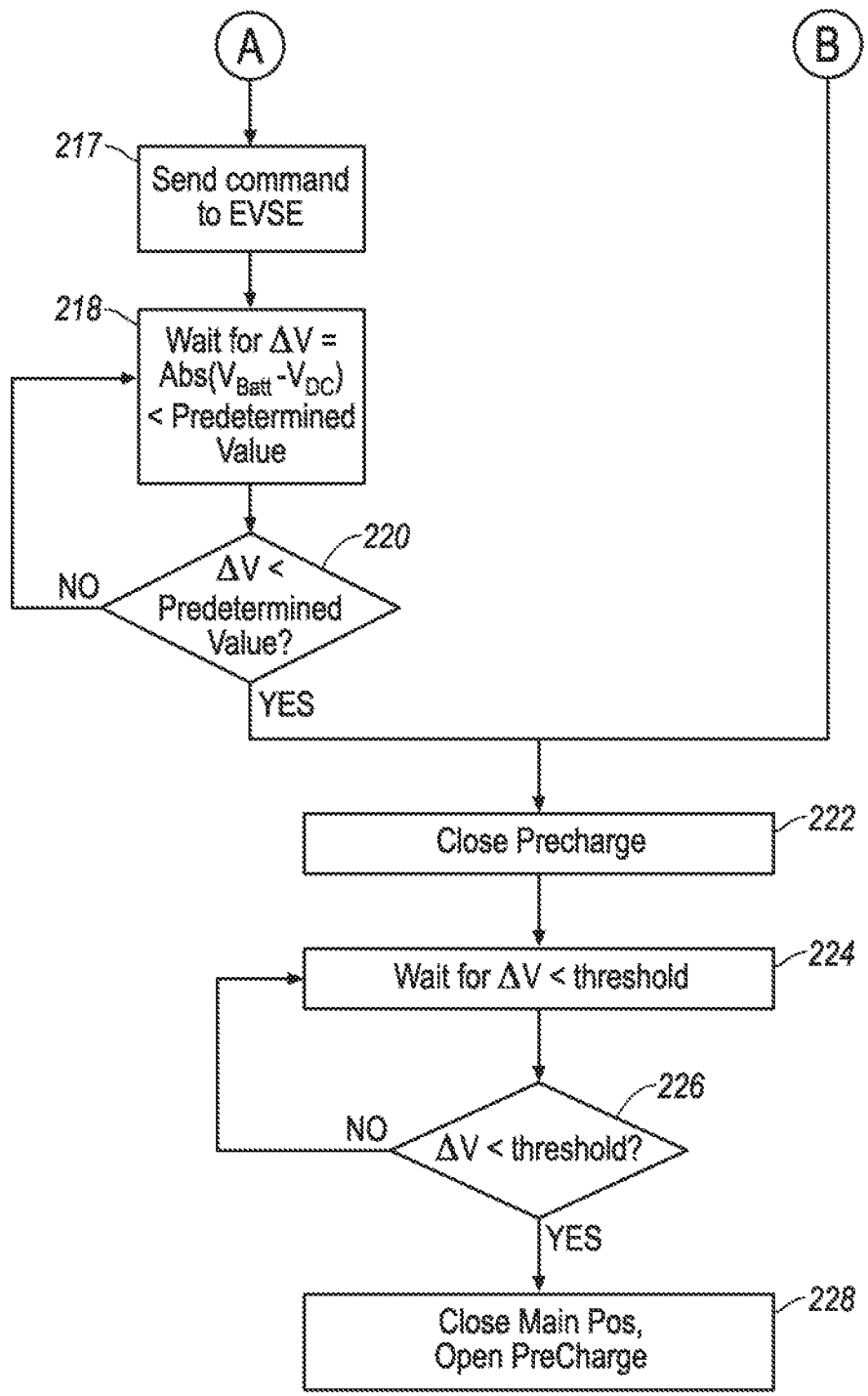

Referring to FIG. 3, a flow diagram 200 for a pre charge process is illustrated. With continuing reference to FIGS. 1 and 2, the process 200 starts at operation 202 when the OBCC 100 triggers a precharge process responsive to detecting that a charging station connector 40 is plugged into the charge port 34. At operation 204, the BECM 33 checks the status of the traction bus contactors 134 to determine the status of the vehicle 12. For instance, the traction bus contactors 134 may be closed to send battery power to the traction bus 130 when the vehicle 12 is in use (e.g. Drive), whereas the traction bus contactor 134 may be open when the vehicle 12 is not in use (e.g. Park). If the BECM 33 detects the traction bus contactors 134 are closed, i.e. the vehicle 12 is in use, the process proceeds to operation 206 and the BECM 33 opens one of the traction bus contactors 134 equipped with the precharge circuit. As illustrated with reference to FIG. 2, in the present embodiment, the BECM 33 opens the traction bus positive contactor 136 to disconnect the battery 24 from the traction bus 130. Since, the traction bus 130 is disconnected from the battery 24, the voltage on the traction bus drops due to the discharge. At operation 208, the BECM 33 waits for the traction bus voltage 132 to discharge below a first predefined threshold (e.g. 20V). Responsive to detecting the traction bus voltage $V_{Trac}$ is less than the first predefined threshold at operation 2110, the process proceeds to operation 214 and the BECM 33 closes the DC contactors 124. As illustrated with reference to FIG. 2, the DC contactors 124 include the DC positive contactor 126 and the DC negative contactor 128. If, otherwise, the BECM 33 detects the traction bus contactors 134 are open at operation 204, indicating the vehicle is not in use, the process proceeds to operation 212. The BECM 33 closes one of the traction bus contactors 134 without the precharge circuit, which is the traction bus negative contactor 138 in the present embodiment. The process proceeds to operation 214. Since the vehicle is not in use and the battery 24 is not connected to the traction bus 130, the BECM 33 may close the DC contactors 124 directly. Because the DC bus contactors 124 are closed at operation 214, the DC bus voltage $V_{DC}$ 122 should be substantially equal to the traction bus voltage $V_{Trac}$ 132.

At operation 216, the BECM 33 waits for and receives a signal indicative of a precharge mode/standard from the OBCC 100. As discussed above, different countries and jurisdictions may use different precharge standards. Continuing to use the present example, the OBCC 100 may transmit a precharge signal corresponding to North America and EU mode based on communication with the charging station 38. Alternatively, the OBCC 100 may transmit a GBT (Quo Biao Tui) signal corresponding to a precharge mode used in China and other regions. If the OBCC 100 transmits the precharge signal, the process proceeds to operation 217 and the BECM 33 sends a signal to the charging station 38 via the OBCC 100 commanding the charging station 38 to increase the voltage on the DC bus 120 to a predefined level. Depending on the configuration of the battery 24 and the charging station 38, the voltage may vary. For instance, the predefined voltage for charging on the DC bus $V_{DC}$ 122 may be substantially the same as or close to the battery voltage $V_{Batt}$ (e.g. 300V). Responsive to the commanding signal, the charging station 38 may start to increase the voltage to the predefined level and the DC bus voltage $V_{DC}$ 122 increases accordingly. At operation 218, the BECM 33 waits until an absolute value of the difference between the battery voltage $V_{Batt}$ 106 and the DC bus voltage $V_{DC}$ 122 is less than a second predefined threshold (e.g. 20V), using the following equation:

$$\Delta V = |V_{Batt} - V_{DC}| < \text{2nd threshold} \tag{1}$$

Responsive to the BECM 33 detecting the condition of equation (1) is met at operation 220, the process proceeds to operation 222 to close the precharge contactor 140. If at operation 216, the OBCC 100 transmits a GBT signal, the process proceeds to operation 222 to close the precharge contactor 140 directly regardless of ΔV and without first commanding the off-board charge to increase the voltage on the bus. This is because in the GBT mode, the vehicle 12 is responsible to precharge the DC bus 120, instead of the charging station 38 being responsive. Therefore, without receiving the commanding signal from the OBCC 100, the charging station 38 does not charge the DC bus 120 or the traction bus 132. In this case, the charging station 38 may be responsible to measure the DC bus voltage $V^{DC}$ 122 which is substantially equal to the traction bus voltage $V_{Trac}$ 132, and starts to supply power to the DC bus responsive to a certain predefined condition being met (e.g. the DC bus voltage $V_{DC}$ 122 reaches a predefined threshold).

At operation 224, the BECM 33 waits for the absolute value of the difference between the battery voltage $V_{Batt}$ 106 and the DC bus voltage $V_{DC}$ 122 (which is substantially equal to the traction bus voltage $V_{Trac}$ 132) to drop to a third predefined threshold (e.g. 5V), using the following equation:

$$\Delta V = |V_{Batt} - V_{DC}| < \text{3rd threshold} \tag{2}$$

Responsive to the BECM 33 detecting the condition of equation (2) is met at operation 226, the process proceeds to operation 228. The BECM 33 closes the traction bus positive contactor 136 and opens the precharge contactor 140 to start charging the battery 24.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight manufacturability, ease of assembly, etc. As such, embodiments described as less desirable than other embodiments or prior art implementations with respect to one or more characteristics are not outside the scope of the disclosure and may be desirable for particular applications.

What is claimed is:
1. A vehicle comprising:
a traction battery;
a bus;
a first main contactor between the traction battery and bus;
a precharge contactor configured to be selectively in parallel with the first main contactor; and
a controller configured to,
during presence of a first precharge mode signal and an open precharge contactor, command a charging station remote from the vehicle to increase a voltage on the bus such that the bus is precharged using power from the charging station, and after a difference between a voltage of the traction battery and the voltage on the bus becomes less than a first threshold, close the precharge contactor, before closing the first main contactor, and during presence of a second precharge mode signal, close the precharge contactor without commanding the charging station to increase the voltage on the bus such that the bus is precharged using power from the traction battery and not power from the charging station, before closing the first main contactor.

2. The vehicle of claim 1, wherein the controller is further configured to open the precharge contactor after closing the first main contactor.

3. The vehicle of claim 1, further comprising:
a second main contactor,
wherein the controller is further configured to, prior to commanding the charging station to increase the voltage or closing the precharge contactor, open the first main contactor after detecting both the first and second main contactors are closed.

4. The vehicle of claim 3, wherein the controller is further configured to, prior to commanding the charging station to increase the voltage or closing the precharge contactor, close the second main contactor after detecting both the first and second main contactors are open.

5. The vehicle of claim 1, further comprising:
a set of direct current (DC) contactors,
wherein the controller is further configured to close the set of DC contactors after the voltage is less than a third threshold.

6. The vehicle of claim 1, wherein the first and second precharge mode signals are received from an off-board charger controller (OBCC).

7. The vehicle of claim 6, wherein the OBCC is configured to transmit the first or second precharge mode signals after to communicating with the charging station.

8. The vehicle of claim 7, wherein the OBCC is configured to communicate with the charging station via at least one of a Wi-Fi connection, a Power Line Communication connection, or a Controller Area Network connection.

9. A method for a vehicle, comprising:
responsive to a first precharge mode signal, commanding a charging station to increase a voltage on a bus such that the bus is precharged using electric power from the charging station;
responsive to a difference between a voltage of the traction battery and the voltage on the bus being less than a first threshold closing a precharge contactor between a battery and the bus such that the precharge contactor is in parallel with a first main contactor; and
responsive to a second precharge mode signal, closing the precharge contactor without commanding the charging station to increase the voltage on the bus such that the bus is precharged using electric power from the battery and not power from the charging station.

10. The method of claim 9, further comprising:
closing a set of DC contactors responsive to the voltage on the bus being less than a third threshold.

11. The method of claim 9, further comprising:
transmitting the first and second precharge mode signals by an off-board charger controller responsive to communicating with the charging station.

12. The method of claim 11, further comprising:
communicating with the charging station via at least one of a Wi-Fi connection, a Power Line Communication connection, or a Controller Area Network connection.

13. A vehicle system comprising:
one or more controllers configured to,
responsive to a first precharge mode signal,
command a charging station to increase a voltage on a bus such that the bus is precharged using power from the charging station, and
responsive to an absolute value of voltage difference between a traction battery voltage and a bus voltage being less than a first threshold, close a precharge contactor, and
responsive to a second precharge mode signal, close the precharge contactor without first commanding a charging station to increase the voltage on the bus such that the bus is precharged using power from the traction battery and not power from the charging station.

14. The vehicle system of claim 13, further comprising:
a first main contactor between a traction battery and the bus configured to be selectively in parallel with the first main contactor,
wherein the one or more controllers are further configured to close the first main contactor and open the precharge contactor, responsive to an absolute value of voltage difference between a traction battery voltage and a bus voltage being less than a second threshold.

15. The vehicle system of claim 13, wherein the one or more controllers are further configured to transmit the first or second precharge mode signals responsive to communicating with the charging station.

16. The vehicle system of claim 13, wherein the one or more controllers are further configured to communicate with the charging station via at least one of a Wi-Fi connection, a Power Line Communication connection, or a Controller Area Network connection.

* * * * *